2,927,095
Patented Mar. 1, 1960

2,927,095

PLASTIC BLENDS COMPRISING RESINOUS COPOLYMER OF AN ARYL MONOMER AND AN ACIDIC MONOMER, AND A GRAFT COPOLYMER OF POLYBUTADIENE, ARYL MONOMER AND ACIDIC MONOMER

Harry S. Witt, East Paterson, N.J., assignor to United States Rubber Company, New York, N.Y., a corporation of New Jersey No Drawing. Application August 2, 1957
Serial No. 675,804

7 Claims. (Cl. 260—45.5)

This invention relates to a plastic mixture, of the kind sometimes referred to as a "gum plastic," comprising a blend of (A) a resinous copolymer of a styrene and an unsaturated acid with (B) a graft polymer of a styrene and an unsaturated acid on polybutadiene rubber. This novel blend is characterized by hardness, stiffness, and high impact resistance at room temperature and at lower temperatures, combined with a very high heat distortion temperature.

Numerous previous attempts have been made to produce tough, impact-resistant gum plastics, either from physical mixtures of resins and rubbers, or from graft polymers of resins and rubbers, or from a combination of the two. However, prior efforts in this direction have unfortunately yielded materials having relatively low heat distortion temperatures, for example, temperatures of only 100° C. or 105° C., at best, and usually well below 100° C.

I have now discovered that it is possible to make gum plastic materials with acceptable toughness which have heat-distortion temperatures of 115° C. and higher. Typical ranges of other physical properties of these materials are listed below:

Tensile _____ 3000–4700 p.s.i.
Elongation _____ 10–20%.
Notched Izod impact R.T. . 2–8 ft.-lbs./in. of notch.
    —20° F. _____ 0.2–2.0 ft.-lbs./in. of notch.
Rockwell hardness _____ 85–105 R.

To obtain this combination of properties, a hard, stiff resinous copolymer of at least 15% of unsaturated acid monomer material and correspondingly up to 85% of a styrene is mixed with a graft polymer comprising about 10% to about 50% of a monomer mixture of an unsaturated acid and a styrene grafted onto about 90% to about 50% of polybutadiene. (All compositional percentages and ratios herein are by weight, unless otherwise specified.) The proportions of resin and graft polymer in the mixture are such that it contains about 15% to about 30% of polybutadiene and correspondingly about 85% to about 70% of total polymerized styrene and unsaturated acid. In the graft polymer, the ratio of the styrene to the unsaturated acid is not critical; this ratio is preferably between about 5:1 and about 3:1.

As the styrene monomer used in making the resinous copolymer, styrene itself is usually preferred on account of its availability at relatively low cost, and its reactivity in copolymerization reactions with other monomers. In place of a part or all of the styrene, substituted styrenes such as alpha-methylstyrene or the nuclear-substituted mono-methylstyrenes may be used. Alpha-methylstyrene is especially valuable in making resins with very high heat distortion temperatures.

As the unsaturated acid monomer material used in making the resinous copolymer, methacrylic acid is usually preferred. Acrylic acid and cinnamic acid may be substituted for a part or all of the methacrylic acid. Acrylic acid is not as effective, weight for weight, as the methacrylic acid in giving a high heat distortion temperature. Cinnamic acid is even more effective in this respect than methacrylic acid, but its present scarcity and relatively high cost are unfavorable to its use.

The heat distortion temperature of the resinous copolymer, and so of the gum plastic composition of my invention, is higher, the greater the proportion of acid monomer material in the copolymer. Usually at least about 15% of acid monomer is required to give any significant improvement in heat distortion temperature, as compared with the corresponding styrene homopolymer. An acid monomer content of about 30% or less is usually found adequate to give the desired heat distortion temperature. For these reasons, and because resins with more than about 30% of acid monomer are difficult to prepare by the emulsion polymerization method which I prefer to use (see infra), the range 15%–30% of acid monomer in the resinous copolymer is preferred. If desirable, however, I may use resins containing more than 30% of acid monomer.

The resinous copolymer employed in the invention may be prepared by any of the well-known conventional polymerization methods, such as emulsion polymerization, solution polymerization, bulk or oil phase polymerization, and bead or suspension polymerization. These methods require no detailed description here, being well-known in the art. Emulsion polymerization is preferred, since the preferred method of blending the resin and the graft polymer involves mixing them as emulsions. Since an acidic material is present, emulsifiers which give stable emulsions in the presence of acid must be used. An example of a suitable polymerization recipe for the resin is as follows:

EXAMPLE A

*Preparation of styrene/methacrylic acid resin*

| Ingredient | Parts by Weight |
|---|---|
| Water | 200 |
| Emulsifiers: | |
|   Sodium lauryl sulfate | 3.5 |
|   Tamol N (Sodium salt of sulfonated naphthalene-formaldehyde condensation product) | 0.5 |
| Sequestering Agent [1] | 0.5 |
| Catalyst—Potassium Persulfate | 0.5 |
| Regulator—Mixed tertiary mercaptans | 0.1 |
| Styrene [2] | 70–85 |
| Methacrylic Acid [2] | 30–15 |

[1] E. g. Sequestrene Na₃, trisodium ethylene-diaminetetraacetate.
[2] Monomers variable within indicated limits, totaling 100.

The foregoing materials are charged into an autoclave or other suitable reaction vessel, emulsified by stirring, and heated until the desired degree of polymerization (preferably 95–100%) is reached. Temperatures in the range 40–70° C., and reaction periods of 1½–20 hours are usually required.

It is most surprising that such a resin can be used in accordance with the invention to provide a tough gum plastic, because such resin itself is brittle and generally unsuitable for making impact-resistant articles. Unexpectedly, such a resin in combination with the graft polymer that will next be described yields a tough, impact-resistant material, as indicated.

The graft polymer employed in the invention is prepared by emulsion polymerization in accordance with the known technique of "grafting" a resin onto a rubber, by emulsion polymerizing the resin-forming monomers in a latex of the previously prepared rubber (in this case, polybutadiene latex). It is believed that by such a technique a substantial proportion of the resin forms as an actual part of the previously formed rubber molecules, so that the rubber and resin are, in effect, chemically united. Whatever the theory or explanation, the fact is that such a graft polymer has different properties from a physical mixture of the separately prepared rubber and resin, or from a simple interpolymer of all of the monomers together.

In preparing the graft polymer employed in the invention, there is first prepared a polybutadiene latex by methods known to those skilled in the art. For the purposes of this invention a stablizer of the type that will produce a latex stable to acid is used, so that flocculation of the latex does not occur during the graft polymerization. Preferably the latex is polymerized to a high solids content (50 to 55%), and is stabilized with anionic emulsifiers which are acid-stable.

A suitable polybutadiene latex for the purposes of this invention may be made by standard emulsion polymerization techniques using the following recipe:

EXAMPLE B

Polybutadiene rubber latex for graft polymer

| | Parts by weight |
|---|---|
| Water | 80 |
| Tamol N (emulsifier—sodium sulfonate of condensation product of naphthalene and formaldehyde) | 3 |
| Nacconol NRSF (emusilfier—alkyl-aryl sodium sulfonate) | 3 |
| Potassium persulfate (catalyst) | 0.5 |
| Soduim hydroxide | 0.3 |
| n-DDM (regulator—normal dodecyl mercaptan) | 0.5 |
| Butadiene | 100 |

The reaction is carried out first at 110° F. for 25 hours, then at 122° F. for 15 hours and finally at 140° F. to essentially complete conversion (this usually requires, e.g., an additional 20 hours).

To make the presently required graft polymer there is then added, to a polybutadiene latex of the foregoing kind, the required resin-forming monomers, viz., a styrene and an unsaturated acid, together with suitable additional quantities of the usual emulsion polymerizing ingredients, such as emulsifying agent and catalyst. (In practice, it is frequently preferred to add resin-forming monomers, emulsifying agent, and catalyst incrementally to the polybutadiene latex, as the graft polymerization reaction proceeds.) The mixture is heated (usually at a temperature of from 5° to 50° C.) while agitating the batch to cause a polymerization of the resin-forming monomers on the polybutadiene. A specific example of a typical graft polymerization recipe is as follows:

EXAMPLE C

Graft polymer preparation

| | Parts by weight |
|---|---|
| Water (total including that in the polybutadiene latex) | 300. |
| Polybutadiene (solid content, added as latex resulting from Example B, above | 80 (variable).[1] |
| Potassium persulfate (catalyst) | 0.5. |
| Sequestrene Na₃ (sequestering agent) | 0.1. |
| Styrene | 16 (variable).[1] |
| Methacrylic acid | 4 (variable).[1] |

[1] The ratio of total monomers added to rubber may vary from about 10/90 to 50/50. The ratio of styrene to methacrylic acid in the added monomers may be from about 5/1 to about 3/1. The total weight of polybutadiene plus monomers is 100 parts.

The graft polymerization of the foregoing recipe is carried out at a temperature of 50° C. The styrene and methacrylic acid, are added incrementally over a period of 2 hours, and the reaction is continued until polymerization is substantially complete.

In the graft polymer, as in the resin, the styrene may be portially or wholly replaced by substituted styrenes, such as the alpha- and nuclear-substituted monomethyl styrenes, and the methacrylic acid may be partially or wholly replaced by other unsaturated acid monomers, such as acrylic acid and cinnamic acid.

Mixing of the resin with the graft polymer to give the gum plastic materials of my invention may be accomplished in various ways, but must always include a step in which the mixed components are mechanically worked, at a temperature high enough to plasticize the mass, in a machine such as a rubber mill or an internal mixer of the Banbury type. This high-temperature mixing insures the intimate blending of the components; a short mixing period of about 5 minutes is usually sufficient. Preliminary blending of the components is preferably accomplished by mixing latices containing the desired amounts of the components, coagulating the mixture, and washing, filtering and drying the product, all by methods well known in the art that need not be detailed here. Such preliminary mixing facilitates the final hot mixing on a mill or the like, reducing the time required. However, if desired, the components may be separately obtained in dried form, and then mixed on a mill or the like.

In determing the properties of the gum plastic, an important factor is the proportion of rubber (polybutadiene) in the final mixture. Increasing the rubber content in general increases the impact resistance, while reducing the stiffness, hardness, and heat distortion temperature. The exact amount of rubber for optimum properties will depend on the particular resin and graft polymer used, and to an even greater extent upon the properties desired in the gum plastic. I have found that amounts of polybutadiene smaller than about 15% (based on the whole gum plastic mixture) usually give products that are too brittle to be useful; while more than about 30% of polybutadienes causes too much lowering of the modulus and the heat distortion temperature. For some purposes, however, it may be desirable to use proportions outside these limits.

In connection with the examples of my invention given below, data on the properties are given. The test methods used to obtain these data were as follows.

Tensile strength (p.s.i.) and elongation (percent) were measured by the usual methods for testing plastic materials.

Impact strength (foot-pounds per inch of notch) was measured using the Izod method with notched test piece.

Hardness was measured by the Rockwell hardness tester, using the "R" scale.

Torsional modulus (p.s.i.) was measured using the apparatus of Clash and Berg (Ind. Eng. Chem., 34, 1218 (1944)).

Heat distortion temperature, as the term is used in this specification, denotes the temperature in degrees centigrade at which the torsional modulus (as determined by my method) is 100,000 lb./sq. in. I have found that this temperature corresponds closely to the heat distortion temperature as determined by the A.S.T.M. standard procedure.

F. for a sufficient time to fuse the powders into a homogeneous sheet (usually about five minutes was required).

Hard, tough, high heat-distortion gum plastics were obtained, as shown in Table I. It can be seen that the blends containing a resin with 25% methacrylic acid have heat distortion temperatures of over 115° C., and that higher acid content in the resin gives even higher heat-distortion temperatures.

TABLE I.—VARIATIONS IN RESINS USED

|  | 1 | 2 | 3 | 4 | 5 | 6 |
|---|---|---|---|---|---|---|
| Percent Acid in Resin | 20 | 20 | 25 | 25 | 30 | 30 |
| Resin/Graft [1] | 69/31 | 62.5/37.5 | 69/31 | 62.5/37.5 | 69/31 | 62.5/37.5 |
| Total Resin [2]/Rubber [3] | 75/25 | 70/30 | 75/25 | 70/30 | 75/25 | 70/30 |
| Tensile | 3,630 | 3,050 | 4,255 | 3,660 | 4,545 | 3,295 |
| Elongation | 12.4 | 13.2 | 14.1 | 18.1 | 13.4 | 11.8 |
| Notched Izod R.T. | 4.6 | 4.0 | 4.7 | 7.6 | 3.7 | 4.3 |
| −20° F. | 0.2 | 2.1 | 2.3 | 3.1 | 0.2 | 1.7 |
| Rockwell Hardness R | 95 | 96 | 96 | 80 | 97 | 82 |
| Tors. Mod.×10⁻³: |  |  |  |  |  |  |
| 25° C | 278 | 232 | 265 | 211 | 271 | 215 |
| 100° C | 112 | 90 | 146 | 116 | 176 | 137 |
| 110° C | 79 | 69 | 132 | 108 | 167 | 132 |
| 115° C | 50 | 52 | 119 | 104 | 158 | 129 |

[1] The resin-forming monomers used in making the graft comprised 80% styrene and 20% methacrylic acid.
[2] "Total Resin" refers to the separately prepared resin plus the resin forming monomers of the graft.
[3] "Rubber" refers to the polybutadiene content.

The invention is more fully described by the following examples, in which all parts and percentages are expressed by weight.

EXAMPLE I

Three styrene/methacrylic acid copolymer resins containing respectively 20, 25 and 30% of methacrylic acid were prepared in latex form by emulsion polymerization as shown in Example A, above. Each of these latices was blended with a latex of a graft polymer (prepared as in Example C, above) of styrene and methacrylic acid on polybutadiene (prepared as in Example B, above) containing 20% of grafted resin forming monomers. With each resin, two different proportions of resin to graft polymer were used, such that the resulting blends contained 25% and 30% polybutadiene.

The resin latex was mixed, by stirring, with the graft polymer latex, and water emulsions of suitable antioxidants for the rubber were added. The blend was then coagulated by the addition of salts of divalent cations, filtered, washed with warm water, and dried at low temperature (150–200° F.). The dry blend was subsequently milled at temperatures of from 340° F.–400°

EXAMPLE II

To a latex of a styrene/methacrylic acid copolymer resin containing 25% methacrylic acid were added latices of graft polymers containing from 87 to 50% polybutadiene with from 13 to 50% of a 4:1 styrene/methacrylic acid mixture grafted thereon. The proportions of resin and graft were such that the final blends all contained 25% polybutadiene. Again, as is shown in Table II, throughout the variations tried, impact resistant materials were obtained which had heat-distortion temperatures of at least 115° C.

TABLE II.—VARIATIONS IN GRAFT POLYMER USED

|  | 7 | 8 | 9 | 10 | 11 | 12 |
|---|---|---|---|---|---|---|
| Graft Composition: |  |  |  |  |  |  |
| Polybutadiene, Percent | 87 | 83 | 73 | 67 | 60 | 50 |
| Styrene, Percent | 10.4 | 13.6 | 21.6 | 26.4 | 32 | 40 |
| Methacrylic Acid, Percent | 2.6 | 3.4 | 5.4 | 6.6 | 8 | 10 |
| Parts of Graft | 28.7 | 30 | 34.3 | 37.3 | 41.7 | 50 |
| Parts of Resin | 71.3 | 70 | 65.7 | 62.7 | 58.3 | 50 |
| Total Resin/Rubber | 75/25 | 75/25 | 75/25 | 75/25 | 75/25 | 75/25 |
| Percent Acid in Resin | 25 | 25 | 25 | 25 | 25 | 25 |
| Tensile | 3,955 | 3,850 | 4,615 | 3,890 | 4,490 | 2,790 |
| Elongation | 14.4 | 14.0 | 13.5 | 13.4 | 14.5 | 8.0 |
| Notched Izod R.T. | 4.4 | 3.0 | 3.0 | 3.0 | 2.3 | 2.0 |
| −20° F | 0.6 | 0.8 | 0.4 | 0.2 | 1.0 | 0.3 |
| Rockwell Hardness R | 96 | 101 | 103 | 100 | 101 | 96 |
| Tors. Mod.×10⁻³: |  |  |  |  |  |  |
| 25° C | 263 | 270 | 282 | 281 | 261 | 255 |
| 100° C | 149 | 159 | 176 | 159 | 151 | 136 |
| 110° C | 144 | 131 | 164 | 136 | 123 | 127 |
| 115° C | 113 | 116 | 140 | 115 | 105 | 94 |

EXAMPLE III

A latex of a styrene/methacrylic acid resin containing 25% methacrylic acid was blended with a latex of a graft polymer latex containing 81% polybutadiene grafted with 19% of a 4:1 styrene/methacrylic acid mixture. The proportions of resin and graft were such that the polybutadiene in the resulting blends varied between 20% and 30%. The data, listed in Table III, show that for the best combination of toughness and high heat-distortion temperature a preferred combination should contain in the neighborhood of 25% polybutadiene.

TABLE III.—VARIATIONS IN RESIN/RUBBER[1] RATIO

|  | 13 | 14 | 15 |
|---|---|---|---|
| Resin/Rubber | 80/20 | 75/25 | 70/30 |
| Tensile | 4,965 | 4,395 | 3,730 |
| Elongation | 13.9 | 15.1 | 13.1 |
| Notched Izod R.T. | 1.3 | 3.7 | 4.0 |
| −20° F | 0.3 | 0.2 | 0.7 |
| Rockwell Hardness R | 109 | 100 | 91 |
| Tors. Modulus×10⁻³: |  |  |  |
| 25° C | 296 | 275 | 243 |
| 100° C | 193 | 169 | 137 |
| 110° C | 161 | 152 | 109 |
| 115° C | 146 | 116 | 88 |
| Graft: |  |  |  |
| Polybutadiene |  | 81 |  |
| Styrene |  | 15.2 |  |
| Methacrylic Acid |  | 3.8 |  |
| Resin: |  |  |  |
| Styrene |  | 75 |  |
| Methacrylic Acid |  | 25 |  |

[1] "Rubber" refers to the polybutadiene content.

EXAMPLE IV

Example III was repeated, using a graft polymer containing 87% of polybutadiene grafted with 13% of a 4:1 styrene/methacrylic acid mixture. The results in Table IV confirm those of Table III.

TABLE IV.—VARIATIONS IN RESIN/RUBBER RATIO

|  | 16 | 17 | 18 |
|---|---|---|---|
| Resin/Rubber | 80/20 | 75/25 | 70/30 |
| Tensile | 4,920 | 4,000 | 3,470 |
| Elongation | 14.1 | 15.2 | 13.5 |
| Notched Izod R.T. | 3.7 | 4.4 | 6.3 |
| −20° F | 0.3 | 1.6 | 2.9 |
| Rockwell "R" | 106 | 97 | 85 |
| Tors. Mod.×10⁻³: |  |  |  |
| 25° C | 328 | 257 | 239 |
| 100° C | 211 | 167 | 146 |
| 110° C | 162 | 139 | 110 |
| 115° C | 144 | 135 | 104 |
| Graft: |  |  |  |
| Polybutadiene |  | 87 |  |
| Styrene |  | 10.4 |  |
| Methacrylic Acid |  | 2.6 |  |
| Resin: |  |  |  |
| Styrene |  | 75 |  |
| MAA |  | 25 |  |

EXAMPLE V

Data are given in Table V below for three mixtures containing 20% rubber and 80% resin. It will be seen that these mixtures, like those of Table III, #13 and Table IV, #16, have exceptionally high heat distortion temperatures, but lower impact strengths than mixtures with higher rubber content. Such mixtures are useful in applications where the highest possible heat resistance is required, and a moderate impact strength is adequate.

TABLE V

|  | 19 | 20 | 21 |
|---|---|---|---|
| Resin/Rubber | 80/20 | 80/20 | 80/20 |
| Tensile | 5,030 | 4,980 | 4,895 |
| Elongation | 13.9 | 14.5 | 16.4 |
| Notched Izod R.T. | 1.9 | 2.2 | 3.2 |
| −20° F | 0.3 | 0.3 | 1.1 |
| Rockwell "R" | 107 | 110 | 105 |
| Tor. Mod.×10⁻³: |  |  |  |
| 25° C | 304 | 330 | 283 |
| 100° C | 200 | 188 | 184 |
| 110° C | 181 | 173 | 152 |
| 115° C | 132 | 154 | 140 |
| Graft: |  |  |  |
| Polybutadiene | 67 | 84 | 87 |
| Styrene | 26.4 | 12.8 | 10.4 |
| MAA | 6.6 | 3.2 | 2.6 |
| Resin: |  |  |  |
| Styrene | 75 | 75 | 75 |
| MAA | 25 | 25 | 25 |

EXAMPLE VI

In order to illustrate the improvements that can be obtained in gum plastics by this invention, a comparison was made of commercially available materials with the new high heat-distortion materials of the invention. Data are given in Table VI for two styrene/acrylonitrile type blends, for one impact resistant polystyrene type, and for a preferred combination of this invention (see Table I, column 3).

TABLE VI.—COMPARISON OF PHYSICAL PROPERTIES

|  | Invention[1] | Material X[2] | Material Y[3] | Material Z[4] |
|---|---|---|---|---|
| Trade Name |  | Royalite 2000. | Styron 480. | Royalite 100. |
| Tensile | 4,255 | 3,700 | 2,080 | 4,590. |
| Elongation | 14 | 75 | 14 | 28. |
| Notched Izod R.T. | 4.7 | 12 | 2.5 | 5.4. |
| −20° F | 2.3 | 1.8 | 0.2 | 0.4. |
| Rockwell R | 96 | 78 | 64 | 100. |
| Tors. Mod.×10⁻³: |  |  |  |  |
| 25° C | 265 | 203 | 179 | 294. |
| 75° C |  |  | 95 |  |
| 90° C |  | 88 |  | 106. |
| 110° C | 132 |  |  |  |
| 115° C | 119 |  |  |  |

[1] Material of Table I, column 3.
[2] Styrene/acrylonitrile resin with butadiene/acrylonitrile rubber (about 70 resin to 30 rubber).
[3] Impact-resistant modified polystyrene; composition not known.
[4] Alpha-methyl styrene/acrylonitrile resin with butadiene/acrylonitrile rubber (about 70 resin to 30 rubber).

In the foregoing examples, resins and grafts using substituted styrenes (e.g., alpha-methyl styrene, nuclear-substituted mono-methyl styrene), in place of styrene itself, or using other unsaturated acid monomers (e.g., acrylic acid, cinnamic acid) in place of methacrylic acid, may be employed in the same manner, giving similar results.

It is desired to emphasize that the blends of the invention provide properties that are not obtainable from a mere mixture of polybutadiene and a resin of the type used in the invention. Such a mixture shows unmistakable evidence of incompatibility of the resin and the rubber; the mixtures are opaque, weak, and completely lacking in the combination of hardness, toughness, and high heat distortion temperature characteristic of the materials of my invention.

The blends of the invention may contain conventional compounding ingredients such as pigments, fillers (zinc oxide, carbon black, silica, diatomaceous earth, etc.), antioxidants, processing aids, plasticizers, curatives, etc. They may be used to good advantage to make all sorts of useful extruded or molded (injection or compression) shapes, as well as milled or calendered sheets or the like which can be after-formed by vacuum drawing or similar operations. They may be expanded by incorporating blowing agents and heating. Expanded and unexpanded sheets may be laminated. The blends of the invention may be substituted to great advantage for the usual rubber or plastic compositions, or even for metals or other materials, in many applications where toughness and resistance to distortion at elevated temperatures are required. Thus, the present mixtures may be used to fabricate parts for machines, such as gears and cams; parts for textile machinery such as bobbins, shuttles, pickers, etc.; containers and pipes, especially for chemical and the like operations where resistance to corrosive substances is desired, as in filter press plates and tumbling barrels for plating operations; electrical parts, such as terminal blocks, telephones, and protective casings for cable joints; as well as tote boxes and trays, luggage, radio cabinets, furniture, phonograph records, signs, small boat hulls and decks, paneling or covering for walls and surfaces of buildings, railroad cars or ships; protective armor including body armor; automobile parts such as headliners, steering wheels, door panels, and seat parts; roller skate wheels, protective helmets, printing plates, tools, die cutting blocks, washing machine parts such as covers, baskets, bearings and impellers, and numerous other articles, as will be evident to those skilled in the art. The blends may be laminated or otherwise reinforced as with fibers, fabrics or wire mesh if desired, in making the foregoing or other articles, although frequently the strength of the blends will be adequate without reinforcement.

Having thus described my invention what I claim and desire to protect by Letters Patent is:

1. A plastic blend characterized by high impact strength and high heat-distortion temperature comprising:

(A) A resinous copolymer consisting of an aryl monomer material selected from the group consisting of styrene, alpha-methylstyrene, the nuclear substituted monomethylstyrenes, and mixtures of said styrenes, copolymerized with an acidic monomer material selected from the group consisting of methacrylic acid, cinnamic acid, acrylic acid, and mixtures of said acids, said resinous copolymer containing copolymerized therein from 20 to 30% by weight of the said acidic monomeric material and correspondingly from 80 to 70% by weight of the said aryl monomeric material, based on the entire weight of said resinous copolymer as 100%, and (B) A graft polymer resulting from the emulsion polymerization in a polybutadiene latex of a monomer mixture consisting of one monomer material selected from each of the two aforementioned groups.

2. A plastic blend as in claim 1, in which the proportions of (A) and (B) are such that the blend contains from about 15% to about 30% by weight of polybutadiene.

3. A plastic blend as in claim 2, in which said graft polymer (B) contains from about 50% to about 90% by weight of polybutadiene.

4. A plastic blend as in claim 2, in which the ratio by weight of said aryl monomer material to said acidic monomer material used in making said graft polymer (B) is from about 5:1 to about 3:1.

5. A plastic blend as in claim 4, in which said aryl monomer material in (A) and (B) is styrene, and said acid monomer material in (A) and (B) is methacrylic acid.

6. A plastic blend as in claim 4, in which said aryl monomer material in (A) and (B) is alpha-methylstyrene, and said acid monomer material in (A) and (B) is methacrylic acid.

7. A plastic blend as in claim 1, in which (A) and (B) are latex-blended.

References Cited in the file of this patent

UNITED STATES PATENTS 2,755,270     Hayes  ---------------- July 17, 1956